United States Patent
Yoshimura et al.

(10) Patent No.: US 7,969,887 B2
(45) Date of Patent: Jun. 28, 2011

(54) STATION

(75) Inventors: Takashi Yoshimura, Minato-ku (JP); Toshihisa Tode, Minato-ku (JP); Syozo Tamaki, Minato-ku (JP)

(73) Assignee: Vodafone Group PLC, Berkshire (GB)

( * ) Notice: Subject to any disclaimer, the term of this patent is extended or adjusted under 35 U.S.C. 154(b) by 590 days.

(21) Appl. No.: 10/523,120

(22) PCT Filed: Mar. 4, 2004

(86) PCT No.: PCT/JP2004/002756
§ 371 (c)(1), (2), (4) Date: May 3, 2006

(87) PCT Pub. No.: WO2004/084570
PCT Pub. Date: Sep. 30, 2004

(65) Prior Publication Data
US 2008/0130505 A1 Jun. 5, 2008

(30) Foreign Application Priority Data
Mar. 17, 2003 (JP) ................................. 2003-071391

(51) Int. Cl.
*H04J 3/14* (2006.01)
*H04L 1/00* (2006.01)
*H04L 12/26* (2006.01)
*H04L 12/28* (2006.01)
*H04L 12/16* (2006.01)

(52) U.S. Cl. ..... 370/236; 370/232; 370/231; 370/230.1; 370/229

(58) Field of Classification Search .................. 370/229, 370/230, 230.1, 231, 232, 233, 234, 235, 370/235.1, 236, 236.1, 236.2, 237, 238, 238.1, 239, 240
See application file for complete search history.

(56) References Cited

U.S. PATENT DOCUMENTS 5,090,011 A * 2/1992 Fukuta et al. ................. 370/230
5,400,329 A * 3/1995 Tokura et al. ................. 370/232
(Continued)

FOREIGN PATENT DOCUMENTS

JP  2001-268651  9/2001
(Continued)

OTHER PUBLICATIONS

SMS Forum, "Short Message Peer-to-Peer Protocol Specification", Feb. 19, 2003, SMS Forum, all pages.*

*Primary Examiner* — Kwang B Yao
*Assistant Examiner* — Adam Duda
(74) *Attorney, Agent, or Firm* — Muirhead and Saturnelli, LLC

(57) ABSTRACT

With the object of eliminating congestion that has occurred in a station which can not prevent or eliminate the occurrence of congestion autonomously, the SMPP response time in output interfaces 21h-21k of a first PPG 21 are measured and when the time mta, which is m-times of the SMPP response time ta in the normal state, is exceeded, congestion is assumed to occur in an interconnected station of the first PPG 21 and the response to push transfer request in an input interface 21a is delayed. Further, changes in the filling ratio in a buffer memory 21b are monitored and when the filling ratio exceeds h %, a decision is made that congestion has occurred in the first PPG 21 and the response to the push transfer request in the input interface 21a is delayed.

25 Claims, 4 Drawing Sheets

U.S. PATENT DOCUMENTS 5,757,772 A * 5/1998 Thornberg et al. ........... 370/236

FOREIGN PATENT DOCUMENTS

| JP | 2002-077300 | 3/2002 |
| JP | 2002-185500 | 6/2002 |
| JP | 2002-368802 | 12/2002 |
| JP | 2003-070059 | 3/2003 |
| WO | WO 97/16039 | 5/1997 |
| WO | WO 97/16040 | 5/1997 |
| WO | WO 99/04536 | 1/1999 |

* cited by examiner

STATION

This application is the U.S. National Phase under 35 U.S.C. §371 of International Application PCT/JP2004/002756, filed on Mar. 4, 2004, which claims priority of Japanese Patent Application No. 2003-071391, which was filed on Mar. 17, 2003. The International Application was published under PCT Article 21(2) in a language other than English.

TECHNICAL FIELD

The present invention relates to congestion control of a station for receiving a message from an interconnected station on the input side and transmitting the message information relating to the received message to the interconnected station on the output side.

BACKGROUND ART

Recently developed cellular telephone systems can receive and transmit multimedia messages including static images, dynamic images, and music. Such multimedia messages can be transmitted and received via internet by cellular telephones adapted to multimedia messages and can be exchanged between the cellular telephones adapted to multimedia messages.

An example of the configuration of the multimedia message allocation system is shown in FIG. 5.

Referring to FIG. 5, a MMS (Multimedia Messaging Service) 1 forms a nucleus of a multimedia messaging service and controls storage, initiation of reception notification, and transfer of the received multimedia messages. The MMS 1 has a mailbox for each subscriber and holds multimedia messages. A PPG (Push Proxy Gateway) 2 is a device for conducting push transfer by which message information of multimedia messages from the MMS 1 or the like is transferred by initiating the network to the portable terminal 4 of a customer. A SMSC (Short Message Service Center) 3 conducts transmission and reception of short messages to and from the portable terminal 4. The portable terminal 4 is a cellular telephone adapted to multimedia messages. A WAP gateway (Wireless Application Protocol Gateway) 5 is a device for interconnecting the internet connection from the portable terminal 4.

The processing flow during allocation of multimedia messages will be explained below with reference to FIG. 5.

If the MMS 1 receives a multimedia message (MM-message), the MM-message is stored in the mailbox of the subscriber, which is the customer in the mailbox 1a, a reception notification (Notification) to the customer is produced, and transfer thereof is initiated. As a result, the MMS 1 requests a push transfer of reception notification to the PPG 2. The PPG 2 that received this request provides a session establishment request to the SMSC 3 so as to initiate the network. The SMSC 3 that received this request transfers to the portable terminal 4 a message that requests to establish a session to the PPG 2. In this case, the SMSC 3 sends the request to the portable terminal 4 as a short message.

The portable terminal 4 that received the request to establish a session to the PPG 2 establishes a session with respect to the PPG 2. As a result, a state of possible communication is established between the PPG 2 and portable terminal 4, and the PPG 2 sends a reception notification from the MMS 1 to the portable terminal 4. The portable terminal 4 that received the reception notification connects to the WAP gateway 5 and transfers to the WAP gateway 5 the notification response (NotifyResp) that came from the portable terminal 4 to the MMS 1. The WAP gateway 5 that receives the notification response sends the transferred notification response to the MMS 1.

The portable terminal 4 then transfers to the WAP gateway 5 a HTTP request (HTTP GET) to acquire a multimedia message from the MMS 1 with a HTTP (Hypertext Transfer Protocol) which is a simple protocol composed of a request and a response corresponding thereto. The WAP gateway 5 received it sends the transferred HTTP request (HTTP GET) to the MMS 1. The MMS 1 receives the HTTP request (HTTP GET) 1, reads the multimedia message stored in the mailbox of the portable terminal and sends it via the WAP gateway 5 to the portable terminal 4. As a result, the portable terminal 4 can receive the multimedia message for which the notification has been received.

In the PPG 2, the communication with the SMSC 3 is conducted with the communication protocol called SMPP (Short Message Peer-to-Peer), but flow control in the SMPP is not clearly defined and this protocol is considered to be unable to prevent or eliminate the appearance of congestion autonomously as a processing system. The resultant problem is that there is a risk of processing being interrupted or terminated in the SMSC 3 or PPG 2 when congestion has occurred in the SMSC 3 or PPG 2. Flow control support was also considered, but in order to produce the SMSC or PPG supporting the flow control, all the existing devices of those types had to be replaced which was unrealistic from the standpoint of cost.

Accordingly, it is an object of the present invention to provide a station such that even if congestion occurs in a station in which congestion cannot be prevented from occurring or eliminated autonomously, the occurred congestion can be eliminated without additional modifications.

DISCLOSURE OF THE INVENTION

In order to attain the above-described object, the present invention provides a station for receiving a message from an interconnected station on the input side and transmitting the message information relating to the received message to the interconnected station on the output side, this station comprising congestion control means composed of congestion detection means for detecting the occurrence of congestion in the interconnected station on the output side and response means for responding by delaying for the prescribed time the response to the request to receive and accept the message from the interconnected station on the input side when the occurrence of congestion has been detected with the congestion detection means.

Further, in the station in accordance with the present invention, the prescribed delay time may be set to a time obtained by dividing the average response time from the interconnected station on the output side by a session number in the interconnected station on the output side that is multiplied by a margin ratio.

Further, in the station in accordance with the present invention, the congestion control means may have switching means for switching the message information of the session in which the congestion has occurred to another session when the occurrence of congestion has been detected in the congestion detection means.

Furthermore, in the station in accordance with the present invention, when there are a plurality of interconnected stations on the output side and the congestion has occurred or a closed state has been assumed in all the sessions to specific interconnected stations on the output side, the switching means may distribute and send the message information to other interconnected stations on the output side.

Further, in the station in accordance with the present invention, congestion detection means may detect that congestion has occurred in the interconnected station on the output side when an error indicating congestion has been returned from the interconnected station on the output side in response to a request to transfer the message information to the interconnected station on the output side.

Furthermore, in the station in accordance with the present invention, the congestion detection means may detect that congestion has occurred in the interconnected station on the output side from a parameter representing a congested state in the response from the interconnected station on the output side to a request to transfer the message information to the interconnected station on the output side, this parameter being contained in the response.

Further, in the station in accordance with the present invention, the congestion detection means may detect that congestion has occurred in the interconnected station on the output side when the average response time in a plurality of the latest responses has reached m times (where m>1) of the average response time in the normal state, in the response from the interconnected station on the output side to a request to transfer the message information to the interconnected station on the output side.

Further, in the station in accordance with the present invention, the congestion detection means may have issuance means for issuing a circuit state verification request with a prescribed period with respect to a session in the interconnected station on the output side that has been detected to be in a congested state in the congestion control means, and the congestion detection means may detect that a congested state in the session has been eliminated when the average response time in a plurality of the latest responses to the issued requests from the issuance means became equal to or less than the average response time in the normal state.

In order to attain the above-described object, the present invention provides another station for receiving a message from an interconnected station on the input side and transmitting the message information relating to the received message to the interconnected station on the output side, the another station comprising congestion control means composed of congestion detection means which detects the occurrence of congestion in the own station when the filling ratio in a buffer memory that stores the messages or received requests that have not been completely processed exceeds the prescribed filling ratio, and response means for responding by delaying for the prescribed time the response to the request to receive and accept the message from the interconnected station on the input side when the occurrence of congestion in the own station has been detected in the congestion detection means.

Further, in the other station in accordance with the present invention, the prescribed delay time may be a time obtained by dividing the average response time from the interconnected station on the output side by a session number in the interconnected station on the output side that is multiplied by a margin ratio.

Furthermore, in the other station in accordance with the present invention, the congestion control means may allow for the detection of congestion occurrence in the interconnected station on the output side and may have switching means for switching the message information of the session in which the congestion has occurred to another session when the occurrence of congestion in the interconnected station on the output side has been detected in the congestion detection means.

Further, in the other station in accordance with the present invention, when there are a plurality of interconnected stations on the output side and the congestion has occurred or a closed state has been assumed in all the sessions to specific interconnected stations on the output side, the switching means may distribute and send the message information to other interconnected stations on the output side.

Furthermore, in the other station in accordance with the present invention, the congestion detection means may detect that congestion has occurred in the interconnected station on the output side when an error indicating congestion has been returned from the interconnected station on the output side in response to a request to transfer the message information to the interconnected station on the output side.

Furthermore, in the other station in accordance with the present invention, the congestion detection means may detect that congestion has occurred in the interconnected station on the output side from a parameter representing a congested state in the response from the interconnected station on the output side to a request to transfer the message information to the interconnected station on the output side, this parameter being contained in the response.

Furthermore, in the other station in accordance with the present invention, the congestion detection means may detect that congestion has occurred in the interconnected station on the output side when the average response time in a plurality of the latest responses has reached m times (where m>1) of the average response time in the normal state, in the response from the interconnected station on the output side to a request to transfer the message information to the interconnected station on the output side.

Furthermore, in the other station in accordance with the present invention, the congestion detection means may have issuance means for issuing a circuit state verification request with a prescribed period with respect to a session in the interconnected station on the output side that has been detected to be in a congested state by the congestion control means, and the congestion detection means may detect that a congested state in a session has been eliminated when the average response time in a plurality of the latest responses to the issued requests from the issuance means became equal to or less than the average response time in the normal state.

With the above-described present invention, when congestion occurs in the own station or an interconnected station on the output side, the response to a request to receive and accept a message from the interconnected station on the input side is delayed for the prescribed time and the throughput on the input side is reduced. As a result, the degree of retention on the output side can be gradually reduced and, therefore, the congestion of the own station or the interconnected station on the output side can be eliminated.

Furthermore, when congestion occurs in the interconnected station on the output side, message information of the session where the congestion has occurred is switched to another session and distributed to other interconnected stations on the output side. As a result, the congestion in the interconnected station on the output side can be eliminated even faster. The occurrence of congestion in the interconnected station on the output side can be detected from the average response time or parameters representing the state of congestion, which are present in the response from the interconnected station on the output side, and the elimination of the congestion state also can be detected from the average response time.

BEST MODE FOR CARRYING OUT THE INVENTION

Figure 1:
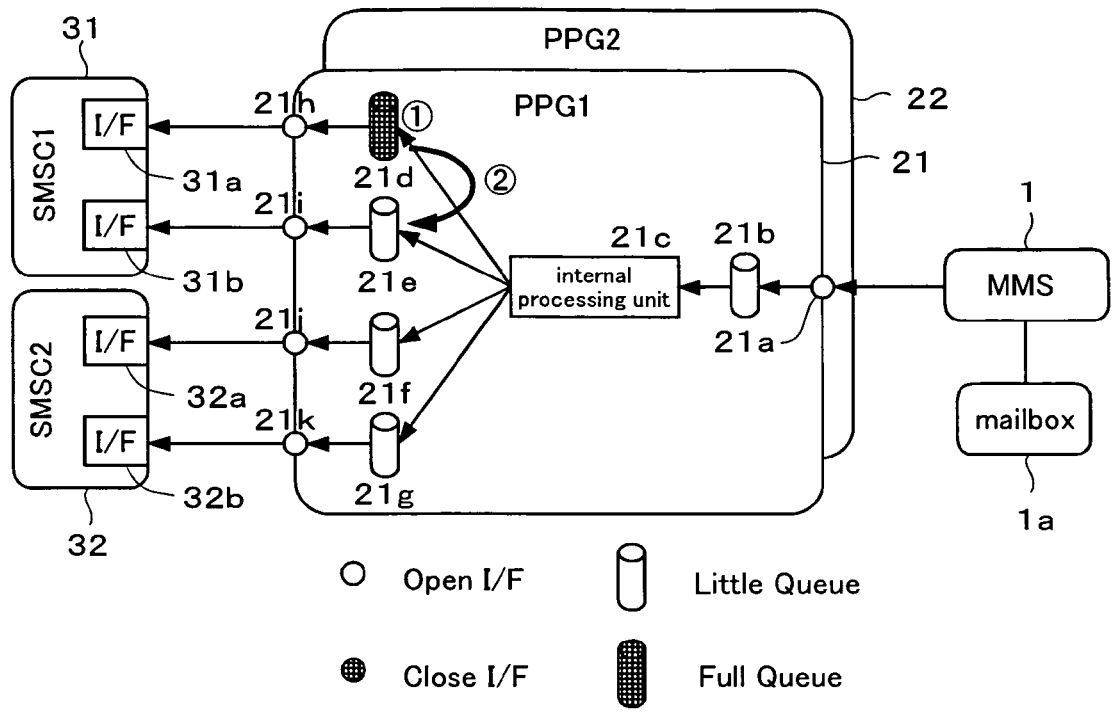
FIG. 1 illustrates schematically the configuration of the station of the preferred embodiment of the present invention is in FIGS; this figure shows a state in which congestion has occurred in a specific session.
Figure 2:
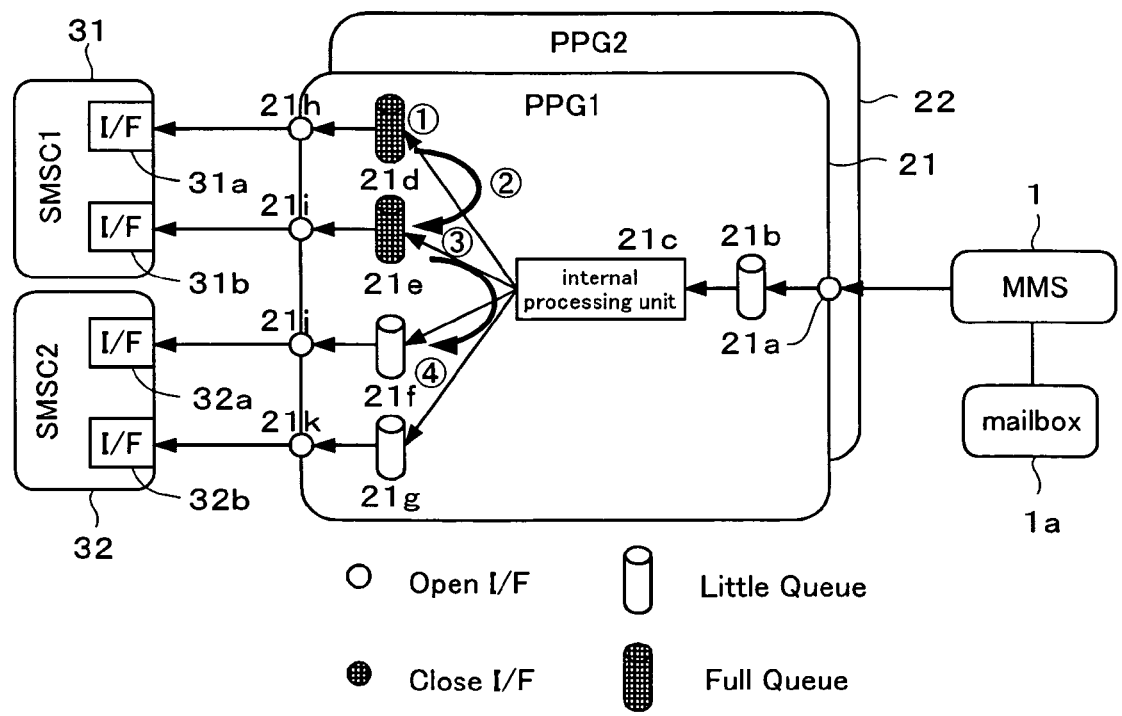
FIG. 2 illustrates schematically the configuration of the station of the preferred embodiment of the present invention is in FIGS; this figure shows a state in which congestion has occurred in a specific SMSC.
Figure 3:
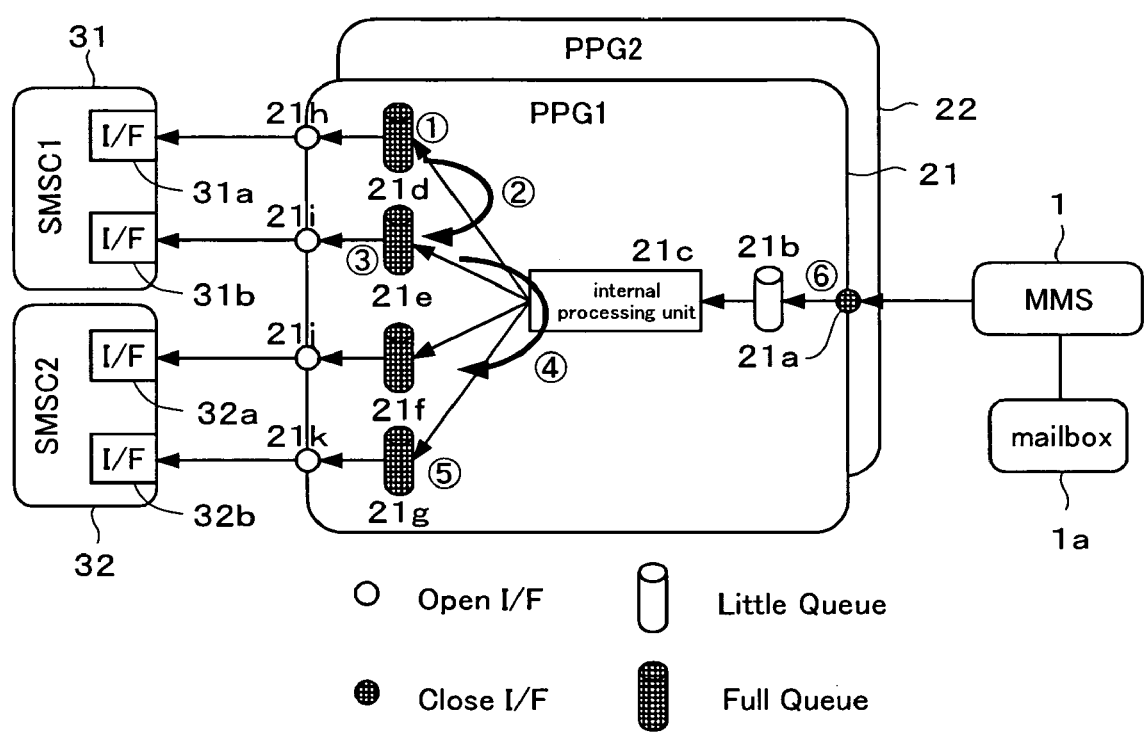
FIG. 3 illustrates schematically the configuration of the station of the preferred embodiment of the present invention is in FIGS; this figure shows a state in which congestion has occurred in all the SMSC.

The configuration of the station of the preferred embodiment of the present invention is shown schematically in FIGS. 1 to 3. FIG. 1 shows a state in which congestion has occurred in a specific session. FIG. 2 shows a state in which congestion has occurred in a specific SMSC. FIG. 3 shows a state in which congestion has occurred in all the SMSC.

Figure 5:
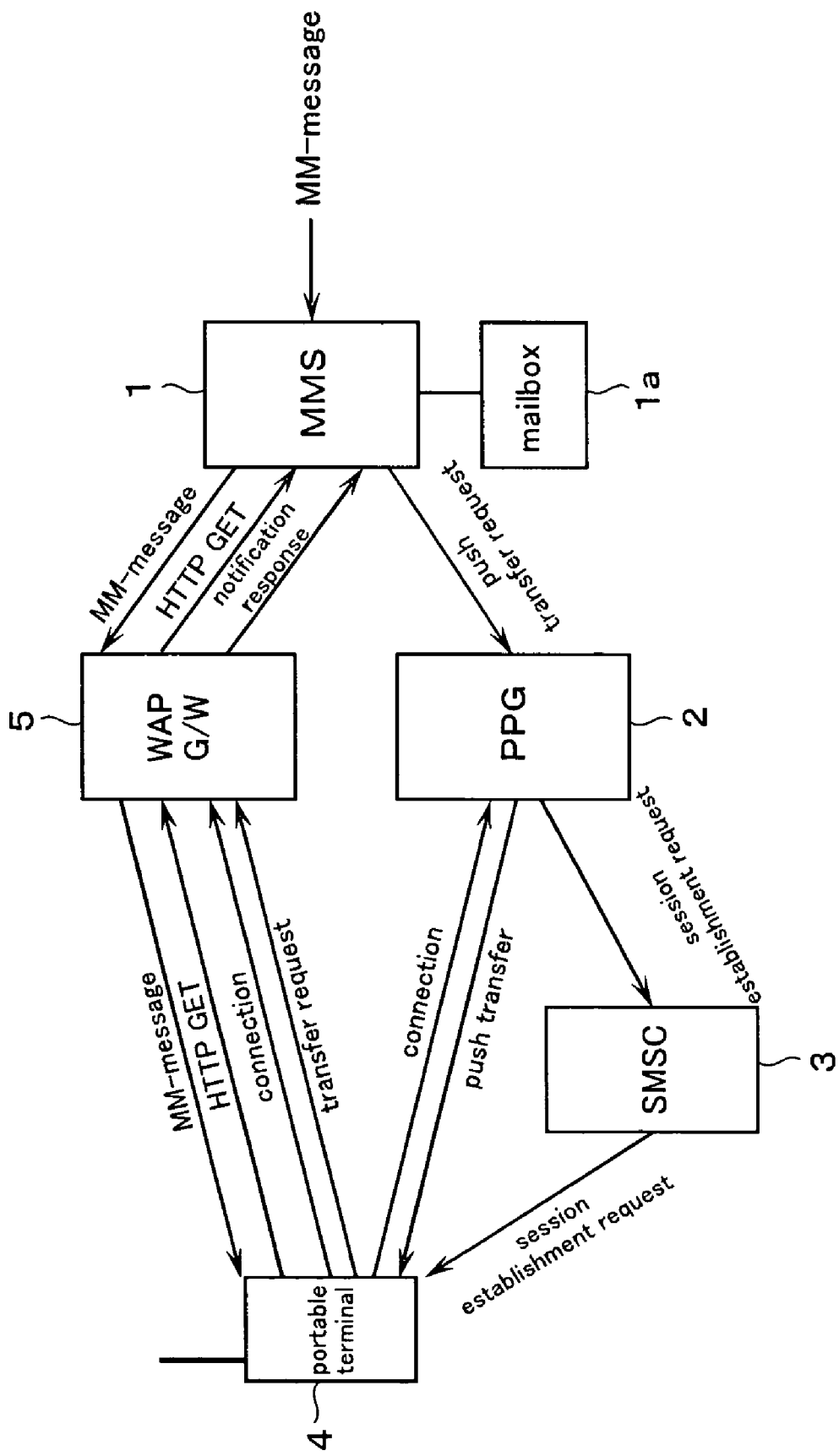
FIG. 5 illustrates an example of prior art configuration of the allocation system of multimedia messages.

FIG. 1 shows only the configuration of the MMS 1, PPG 2, and SMSC 3 in the multimedia message allocation system shown in FIG. 5. The PPG 2 is composed of 2 units: a first PPG (PPG1) 21 and a second PPG (PPG2), and the SMSC 3 is also composed of two units: a first SMSC (SMSC1) 31 and a second SMSC (SMSC2) 32.

The congestion control means of the station in accordance with the present invention will be explained hereinbelow with reference to FIG. 1. If the MMS 1 receives a multimedia message (MM-message), the MM-message is stored in a mailbox 1a of the subscriber, which is a customer in the mailbox 1a, a reception notification to the customer is produced, and transfer thereof is initiated. As a result, the MMS 1 sends a push transfer request of notification, for example, to the first PPG 21. This push transfer request is received by an input interface 21a of the first PPG 21 and temporarily stored in a buffer memory 21b. An internal processing unit 21c reads successively the push transfer requests that were stacked in the buffer memory 21b and produces a session establishment request so that a network corresponding to each push transfer request is initiated. The session establishment request is temporarily stored in a corresponding memory of buffer memories 21d, 21e, 21f, 21g provided for each of the four provided output interfaces 21h, 21i, 21j, 21k. If we assume that the session establishment request is stored in the buffer memory 21d, then the session establishment requests that were stacked in the buffer memory 21d are read successively and sent from the output interface 21h to the first SMSC 31.

The sent session establishment requests are received in an interface (I/F) 31a of the first SMSC 31 and sent as short messages from the first SMSC 31 to a portable terminal not shown in FIG. 1 of the destination address. Further, if the session establishment request is stored in the buffer memory 21e, then the session establishment requests that were stacked in the buffer memory 21e are read successively and sent from the output interface 21i to the first SMSC 31. The sent session establishment requests are received in an interface (I/F) 31b of the first SMSC 31 and sent as short messages from the first SMSC 31 to a portable terminal not shown in FIG. 1 of the destination address. Further, if the session establishment request is stored in the buffer memory 21f, then the session establishment requests that were stacked in the buffer memory 21f are read successively and sent from the output interface 21j to the second SMSC 32. The sent session establishment requests are received in an interface (I/F) 32a of the second SMSC 32 and sent as short messages from the second SMSC 32 to a portable terminal not shown in FIG. 1 of the destination address. Furthermore, if the session establishment request is stored in the buffer memory 21g, then the session establishment requests that were stacked in the buffer memory 21g are read successively and sent from the output interface 21k to the second SMSC 32. The sent session establishment requests are received in an interface (I/F) 32b of the second SMSC 32 and sent as short messages from the second SMSC 32 to a portable terminal not shown in FIG. 1 of the destination address.

Similar operations are also carried out with respect to session establishment requests sent from the second PPG 22 to the first SMSC 31 and second SMSC 32. Here, if the message number of the session establishment requests sent from the first PPG 21 and second PPG 22 exceeds the amount that can be processed in the first SMSC 31 and second SMSC 32, then congestion occurs in the first SMSC 31 and second SMSC 32. In this case, the definition of congestion occurrence is based on any of the below-described events. In this definition the first PPG 21 and second PPG 22 are considered as a PPG, and the first SMSC 31 or second SMSC 32 is considered as the SMSC.

(1) When an error indicating the congestion of the session was returned from the SMSC with respect to a message submit_sm or message data_sm of the message transfer request from the PPG to the SMSC.

(2) When the response to message submit_sm or message data_sm of the message transfer request contains a congestion_state parameter representing the congestion state in percents and the value of this parameter reaches a value indicating the congestion of the SMSC.

(3) When the average response time from the SMSC to k latest requests from the message transfers request from the PPG exceeds m times of the average response time in a normal state. Here, k and m can be set and varied by parameters or the like.

It is assumed that the occurrence of congestion in the session in the interface 31a of the first SMSC 31, which is an interconnected station of the first PPG 21, is detected based on this definition. This is shown by the buffer memory 21d becoming a Full Queque as ① in FIG. 1. When congestion of the interconnected station thus occurs in a specific SMPP session, the first PPG 21 eliminates the congestion in the manner as follows. Thus, the first PPG 21 continues the service by switching the messages to the interface 31b, which is another SMPP session directed toward the first SMSC 31, as shown by ② in the figure, so that the number of messages directed toward this session in a unit interval becomes 1/m or less.

Thus, in the PPG which is the station in accordance with the present invention, when congestion occurs in the PPG interconnected station in a specific SMPP session, the PPG continues the service by switching the messages to another SMPP session directed toward the same SMSC so that the number of messages directed toward this session in a unit interval becomes 1/m or less.

If the acceptance response to a push transfer request from the MMS 1 to the PPG is delayed for the prescribed time when congestion has occurred in the PPG interconnected station in a specific SMPP session, then, the acceptance number of push transfer requests can be reduced. Therefore, the congestion occurring in a specific SMPP session can be gradually eliminated. This delay time can be considered as the below-described delay time Dt.

Further, let us assume that congestion was detected to occur in both the session in the interface 31*a* and the session in the interface 31*b* of the first SMSC 31 which is an interconnected station of the first PPG 21. This is shown by the buffer memory 21*d* and buffer memory 21*e* becoming a Full Queue as ①③ in FIG. 2. When congestion of the interconnected station thus occurs in all the SMPP sessions directed toward the first SMSC 31, the first PPG 21 eliminates the congestion in the manner as follows. Thus, when all the sessions directed toward the first SMSC 31 are in a state of PPG interconnected station congestion or closed state, the first PPG 21 continues the service by distributing the messages equally to the second SMSC 32 which is not in a congested state, as shown by ④ in FIG. 2.

Thus, when the PPG interconnected station congestion has occurred or a closed state has been assumed in all the sessions directed toward a specific SMSC in the PPG, which is the station in accordance with the present invention, the PPG continues the service by distributing the messages equally to other SMSC.

If the acceptance response to a push transfer request from the MMS 1 to the PPG is delayed for the prescribed time when the PPG interconnected station congestion has occurred or a closed state has been assumed in all the sessions directed toward a specific SMSC in the PPG, then, the acceptance number of push transfer requests can be reduced. Therefore, the congestion that has occurred in all the sessions of a specific SMSC can be successively eliminated. This delay time can be considered as the below-described delay time Dt.

Further, let us assume that congestion was detected to occur in all the sessions of the first SMSC 31 and second SMSC 32 which are the interconnected stations of the first PPG 21. This is shown by all the buffer memories from the buffer memory 21*d* to the buffer memory 21*g* becoming a Full Queque as ①③⑤ in FIG. 3. When congestion of the interconnected stations thus occurs in all the SMPP sessions directed toward the first SMSC 31 and second SMSC 32, the first PPG 21 eliminates the congestion in the manner as follows. Thus, when the PPG interconnected station congestion has occurred or a circuit block state has been assumed in the first SMSC 31 and second SMSC 32, the first PPG 21 denies the acceptance of the push transfer request from the MMS 1. As a result, the filling amount of buffer memories from the buffer memory 21*d* to buffer memory 21*g* decreases gradually and the of PPG interconnected station congestion or circuit block state is eliminated.

Thus, in the PPG, which is the station in accordance with the present invention, when the PPG interconnected station congestion has occurred or a closed state has been assumed in all the SMSC, the PPG denies the acceptance of the push transfer request from the MMS, thereby eliminating the PPG interconnected station congestion or circuit block state. Further, instead of denying the acceptance of the push transfer request, the acceptance response to the push transfer request from the MMS 1 to the PPG may be delayed for the prescribed time. This delay time can be considered as the below-described delay time Dt. As a result, the acceptance number of push transfer requests can be reduced. Therefore, the PPG interconnected station congestion or circuit block state in all the SMSC can be gradually eliminated.

As described hereinabove, in the station in accordance with the present invention, when congestion occurs in an interconnected station on the output side, the service can be continued by allocating messages to another session on the output side or to another interconnected station on the output side. In addition, the congestion may be eliminated by returning the response to the request from the interconnected station on the input side with a prescribed delay. Thus, in the station in accordance with the present invention, a mechanism is provided for detecting changes in the transfer efficiency on the output side and the acceptance number on the input side is reduced when the transfer efficiency has degraded. Further, when congestion occurs in all the interconnected stations on the output side, the acceptance of the request from the interconnected station on the input side may be denied. Thus, with the station in accordance with the present invention, the occurrence of congestion can be prevented or congestion can be eliminated without additional improvements of the interconnected stations. Therefore, the congestion control of the SMSC that heretofore required the maintenance personnel to conduct monitoring and take care of the system can be automated, thereby making contribution to the reduction of maintenance and operation cost of the PPG.

As described hereinabove, because the PPG conducts congestion control, the congestion that has occurred in the SMSC can be gradually eliminated. Here, the definition of "PPG interconnected station congestion" elimination is based on the occurrence of any of the following events.

(1) The PPG issues a message enquire_link request, which is a circuit state verification message, with n-second intervals to the SMPP session that assumed a PPG interconnected station congestion state. The congestion is considered to be eliminated when the average response time to the k latest message enquire_link requests is within the average response time in a normal state. The k and transmission interval spacing n can be set and varied by parameters or the like.

(2) The congestion is considered to be eliminated when the average response time to the latest k message enquire_link requests is below the average response time in a normal state.

Once congestion has been detected to be eliminated in the session in which the congestion has occurred in the PPG based on such definition, the above-described congestion control relating to this session is cancelled.

However, congestion occurs not only in the interconnected stations, but also in the PPG which is a station by itself. Explanation will be conducted below by considering the first PPG 21 as an example, with reference to a graph illustrating a filling ratio shown in the upper part in FIG. 4. In the first PPG 21 shown in FIGS. 1 to 3, the accepted unprocessed messages or requests are accumulated in the buffer memory 21*b*. Assuming that the maximum capacity available for accumulation in the buffer memory 21*b* is 100%, if the filling ratio exceeds h %, then the "PPG own station congestion" is considered to occur as an excess over an amount that can be processed in the internal processing unit 21*c*. Further, the filling ratio becoming less than 1% defines the "PPG own station congestion". Here, h and l can be set and varied by parameters or the like.

If the filling ratio in the buffer memory 21*b* in the first PPG 21 is detected to exceed h %, a decision is made that a "PPG own station congestion" has occurred and the first PPG 21 sends a reception-acceptance response (push-response) to the push transfer request from the MMS 1 after the delay time Dt, which can be calculated by the following formula, elapses.

$$Dt = SMPP \text{ average response time}/SMPP \text{ session number} \times S \quad (1)$$

Here, S is a margin ratio less than 1, that can be set and varied by parameters or the like. Further, when the in the buffer memory 21b of the becomes 100%, the first PPG 21 denies a push transfer request from the MMS 1 until the filling ratio becomes lower than h %. If the PPG conducts congestion control as described above, the congestion that occurred in the own station is gradually eliminated. Further, when the filling ratio becomes less than 1%, the response to the push transfer request is sent without any delay to the MMS 1.

The above-described congestion control executed in the PPG which is the station in accordance with the present invention will be explained below with reference to FIG. 4.

The SMPP response time in the output interfaces 21h-21k of the first PPG 21 are measured in the first PPG 21. Changes in the measured SMPP response time with time t are shown by a graph presented in the lower part of FIG. 4. In this graph, time ta represents the average response time in the normal state to the session establishment request. When the average SMPP response time to k latest session establishment requests exceeds the time mta obtained by multiplying the time ta by m, then congestion is assumed to occur in the interconnected station of the first PPG 21 and the PAP response time, which is a response time to the push transfer request in the input interface 21a, is adjusted. This adjustment is conducted by delaying the reception-acceptance response for the delay time Dt calculated by Formula (I) presented above.

Figure 4:
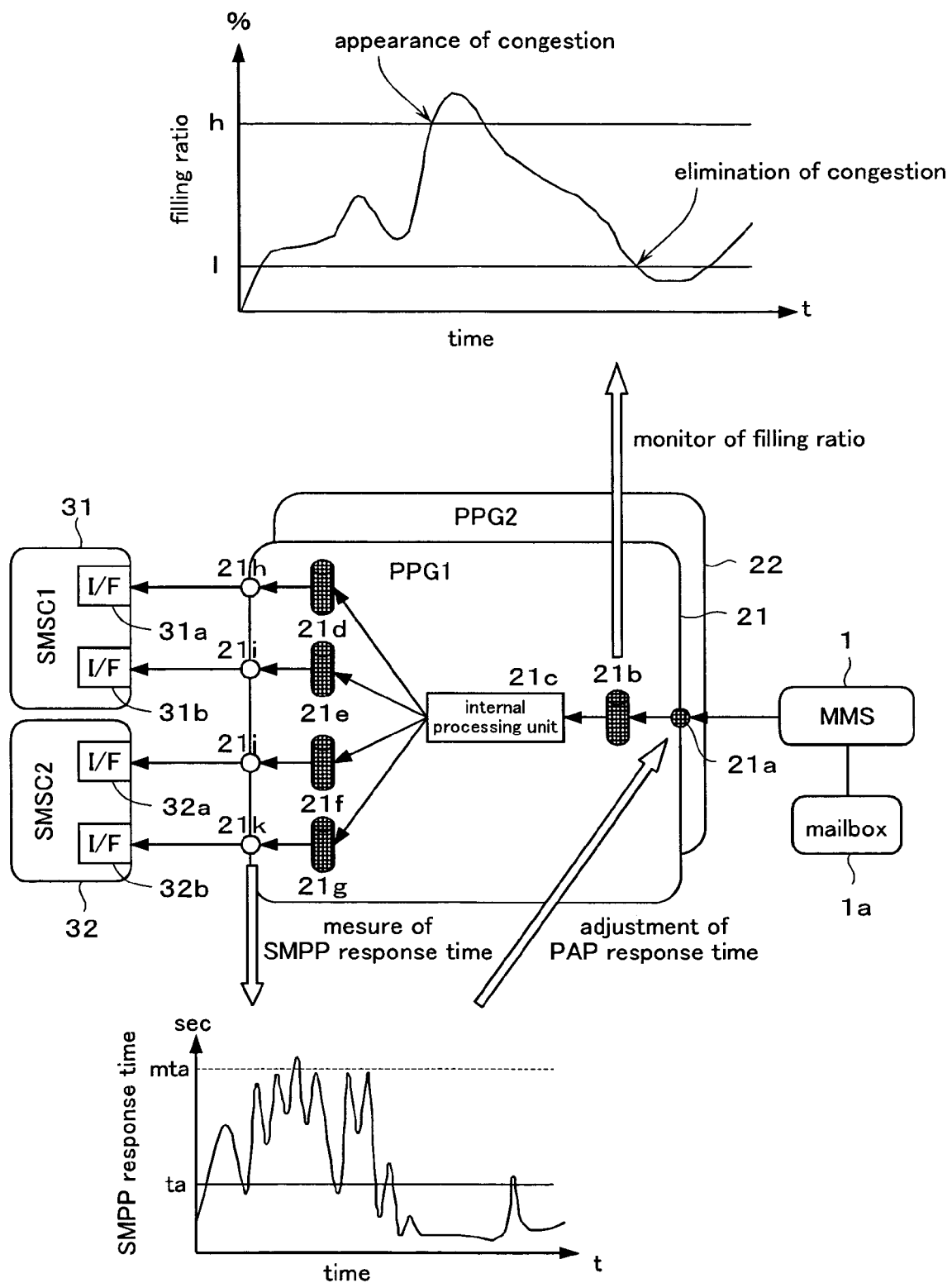
FIG. 4 illustrates congestion control executed in the PPG which is a station in accordance with the present invention.

In the upper part of FIG. 4, there is shown a graph illustrating changes in the filling ratio with time t in the buffer memory 21b where the accepted unprocessed messages or requests are accumulated. Variations of the filling ratio in the buffer memory 21b are monitored and when the filling ratio exceeds h %, a decision is made that congestion has occurred in the first PPG 21 and the PAP response time, which is a response time to the push transfer request in the input interface 21a, is adjusted. This adjustment is conducted by delaying the response for the delay time Dt calculated by Formula (1) presented above. When the filling ratio becomes less than 1%, a decision is made that the congestion in the first PPG 21 was eliminated and the adjustment of the PAP response time is canceled.

The explanation above was considered with respect to the PPG as the station in accordance with the present invention, but the present invention is not limited to such a configuration, and the congestion control means provided in the station in accordance with the present invention also can be applied to station in which the occurrence of congestion cannot be autonomously prevented or eliminated.

INDUSTRIAL APPLICABILITY

As described hereinabove, in the station in accordance with the present invention, when congestion occurs in the own station or an interconnected station on the output side, the throughput on the input side is reduced by delaying for the prescribed time the response to a request to receive and accept the message from the interconnected station on the input side. As a result, the degree of retention on the output side can be gradually reduced and the congestion of the own station or the interconnected station on the output side can be eliminated.

Furthermore, when congestion occurs in the interconnected station on the output side, message information of the session where the congestion has occurred is switched to another session and distributed to other interconnected stations on the output side. As a result, the congestion in the interconnected station on the output side can be eliminated even faster. The occurrence of congestion in the interconnected station on the output side can be detected from the average response time or parameters representing the state of congestion, which are present in the response from the interconnected station on the output side, and the elimination of the congestion state also can be detected from the average response time.

The invention claimed is:

1. A station for receiving a message from a first interconnected station on an input side and transmitting message information relating to the received message to a second interconnected station on an output side, comprising:
  response means for returning a response to a request to receive and accept the message, the request being sent from the first interconnected station, wherein a content of the response to the request to receive and accept the message includes an acceptance notice that is responsive to the request and indicates to the first interconnected station whether the message sent from the first interconnected station was received and accepted; and
  congestion detection means, coupled to the response means, for detecting that congestion has occurred in the second interconnected station, wherein, when occurrence of congestion is detected by said congestion detection means, said response means conducts congestion control by delaying the response to the request to receive and accept said message from being transmitted to the first interconnected station for a prescribed delay time, wherein delaying transmission of the response to the first interconnected station by the prescribed delay time causes a reduction in message throughput received by the station on the input side from the first interconnected station, wherein the congestion control is provided by the delaying of the transmission of the response, that includes the acceptance notice, to the first interconnected station independent of any transmission of congestion information to the first interconnected station.

2. The station according to claim 1, wherein said prescribed delay time is a time obtained by dividing an average response time from the second interconnected station by a session number in the second interconnected station that is multiplied by a margin ratio.

3. The station according to claim 1, wherein the congestion control is also conducted with switching means for switching said message information to another session when the occurrence of congestion is detected by said congestion detection means.

4. The station according to claim 3, wherein when there are a plurality of interconnected stations on the output side and congestion has occurred or a closed state has been assumed in all the sessions to a specific interconnected station on the output side, said switching means distributes and sends said message information to other interconnected stations on the output side.

5. The station according to claim 1, wherein said congestion detection means detects that congestion has occurred in the second interconnected station when an error indicating congestion is returned from the second interconnected station in response to a request to transfer said message information to the second interconnected station on the output side.

6. The station according to claim 1, wherein said congestion detection means detects that congestion has occurred in the second interconnected station from a parameter representing a congested state in the response from the second interconnected station to a request to transfer said message information to the second interconnected station, the parameter being contained in said response.

7. The station according to claim 1, further comprising:
  issuance means for issuing a circuit state verification request with a prescribed period with respect to a session in the second interconnected station that is detected to be in a congested state by said congestion detection means, wherein said congestion detection means detects that a congested state in said session has been eliminated when an average response time in a plurality of the latest responses to the issued requests from said issuance means has become equal to or less than an average response time in a normal state.

8. The station according to claim 1, wherein the message is one of a plurality of messages received from the first interconnected station, and wherein the response means responds to the request to receive and accept for each message.

9. A station for receiving a message from a first interconnected station on an input side and transmitting message information relating to the received message to a second interconnected station on an output side, comprising:
response means for returning a response to a request to receive and accept the message, the request being sent from the first interconnected station, wherein a content of the response to the request to receive and accept the message includes an acceptance notice that is responsive to the request and indicates to the first interconnected station whether the message sent from the first interconnected station was received and accepted; and
congestion detection means, coupled to the response means, which detects the occurrence of congestion in the station when the filling ratio in a buffer memory that stores said messages or received requests that have not been completely processed exceeds a prescribed filling ratio, wherein, when the occurrence of congestion in the station is detected by said congestion detection means, said response means conducts congestion control by delaying the response to the request to receive and accept said message from being transmitted to the first interconnected station, wherein delaying transmission of the response to the first interconnected station by the prescribed delay time causes a reduction in message throughput received by the station on the input side from the first interconnected station, wherein the congestion control is provided by the delaying of the transmission of the response, that includes the acceptance notice, to the first interconnected station independent of any transmission of congestion information to the first interconnected station.

10. The station according to claim 9, wherein said prescribed delay time is a time obtained by dividing an average response time from the second interconnected station by a session number in the second interconnected station that is multiplied by a margin ratio.

11. The station according to claim 9, wherein the congestion control is also conducted with switching means for switching said message information to another session when the occurrence of congestion in the second interconnected station is detected by said congestion detection means.

12. The station according to claim 11, wherein when there are a plurality of interconnected stations on the output side and congestion has occurred or a closed state has been assumed in all the sessions to a specific interconnected station on the output side, said switching means distributes and sends said message information to other interconnected stations on the output side.

13. The station according to claim 9, wherein said congestion detection means detects that congestion has occurred in the second interconnected station when an error indicating congestion has been returned from the second interconnected station in response to a request to transfer said message information to the second interconnected station.

14. The station according to claim 9, wherein said congestion detection means detects that congestion has occurred in the second interconnected station from a parameter representing a congested state in the response from the second interconnected station to a request to transfer said message information to the second interconnected station, the parameter being contained in said response.

15. The station according to claim 9, further comprising:
issuance means for issuing a circuit state verification request with a prescribed period with respect to a session in the second interconnected station that is detected to be in a congested state by said congestion detection means, wherein said congestion detection means detects that the congested state in said session has been eliminated when an average response time in a plurality of the latest responses to the issued requests from said issuance means has become equal to or less than an average response time in a normal state.

16. The station according to claim 9, wherein the message is one of a plurality of messages received from the first interconnected station, and wherein the response means responds to the request to receive and accept for each message.

17. A station for receiving a message from a first interconnected station on an input side and transmitting message information relating to the received message to a second interconnected station on an output side, comprising:
a response unit that sends a response to a request to receive and accept the message, the request being sent from the first interconnected station, wherein a content of the response to the request to receive and accept the message includes an acceptance notice that is responsive to the request and indicates to the first interconnected station whether the message sent from the first interconnected station was received and accepted; and
a congestion detector, coupled to the response unit, that detects whether congestion has occurred in the second interconnected station, wherein, when occurrence of congestion is detected by the congestion detector, the response unit conducts congestion control by delaying the response to the request to receive and accept the message from being transmitted to the first interconnected station for a prescribed delay time, wherein delaying transmission of the response to the first interconnected station by the prescribed delay time causes a reduction in message throughput received by the station on the input side from the first interconnected station, wherein the congestion control is provided by the delaying of the transmission of the response, that includes the acceptance notice, to the first interconnected station independent of any transmission of congestion information to the first interconnected station.

18. The station according to claim 17, wherein the prescribed delay time is a time obtained by dividing an average response time from the second interconnected station by a session number in the second interconnected station that is multiplied by a margin ratio.

19. The station according to claim 17, further comprising:
a switch that switches the message information to another session when the occurrence of congestion is detected by the congestion detector.

20. The station according to claim 19, wherein, when there are a plurality of interconnected stations on the output side and congestion has occurred or a closed state has been assumed in all the sessions to a specific interconnected station on the output side, the switch distributes and sends the message information to other interconnected stations on the output side.

21. The station according to claim 17, further comprising:
a verification request issuer that issues a circuit state verification request with a prescribed period with respect to a session in the second interconnected station that is detected to be in a congested state by said congestion detector, wherein the congestion detector detects that a congested state in said session has been eliminated when the average response time in a plurality of the latest responses to the issued requests from the verification request issuer has become equal to or less than an average response time in a normal state.

22. That station according to claim 17, wherein the congestion detector detects that congestion has occurred in the second interconnected station when at least one of the following occurs:
an error indicating congestion is returned from the second interconnected station in response to a request to transfer the message information to the second interconnected station; or
a parameter representing a congested state is included in a transfer response from the second interconnected station received in response to the request to transfer the message information to the second interconnected station.

23. A station for receiving a message from a first interconnected station on an input side and transmitting message information relating to the received message to a second interconnected station on an output side, comprising:
response means for returning a response to a request to receive and accept the message, the request being sent from the first interconnected station, wherein the response to the request to receive and accept the message indicates whether the message was received and accepted; and
congestion detection means, coupled to the response means, for detecting that congestion has occurred in the second interconnected station, wherein, when occurrence of congestion is detected by said congestion detection means, said response means conducts congestion control by delaying the response to the request to receive and accept said message from being transmitted to the first interconnected station for a prescribed delay time, wherein delaying transmission of the response to the first interconnected station by the prescribed delay time causes a reduction in message throughput received by the station on the input side from the first interconnected station, wherein said congestion detection means detects that congestion has occurred in the second interconnected station when the average response time in a plurality of the latest responses has reached m times (where m>1) of the average response time in the normal state, in the response from the second interconnected station to a request to transfer said message information to the second interconnected station.

24. A station for receiving a message from a first interconnected station on an input side and transmitting message information relating to the received message to a second interconnected station on an output side, comprising:
response means for returning a response to a request to receive and accept the message, the request being sent from the first interconnected station, wherein the response to the request to receive and accept the message indicates whether the message was received and accepted; and
congestion detection means, coupled to the response means, which detects the occurrence of congestion in the station when the filling ratio in a buffer memory that stores said messages or received requests that have not been completely processed exceeds a prescribed filling ratio, wherein, when the occurrence of congestion in the station is detected by said congestion detection means, said response means conducts congestion control by delaying the response to the request to receive and accept said message from being transmitted to the first interconnected station, wherein delaying transmission of the response to the first interconnected station by the prescribed delay time causes a reduction in message throughput received by the station on the input side from the first interconnected station, wherein said congestion detection means detects that congestion has occurred in the second interconnected station when the average response time in a plurality of the latest responses has reached m times (where m>1) of the average response time in the normal state, in the response from the second interconnected station to a request to transfer said message information to the second interconnected station.

25. A station for receiving a message from a first interconnected station on an input side and transmitting message information relating to the received message to a second interconnected station on an output side, comprising:
a response unit that sends a response to a request to receive and accept the message, the request being sent from the first interconnected station, wherein the response to the request to receive and accept the message indicates whether the message was received and accepted; and
a congestion detector, coupled to the response unit, that detects whether congestion has occurred in the second interconnected station, wherein, when occurrence of congestion is detected by the congestion detector, the response unit conducts congestion control by delaying the response to the request to receive and accept the message from being transmitted to the first interconnected station for a prescribed delay time, wherein delaying transmission of the response to the first interconnected station by the prescribed delay time causes a reduction in message throughput received by the station on the input side from the first interconnected station, wherein the congestion detector detects that congestion has occurred in the second interconnected station when an average response time in a plurality of the latest responses has reached m times (where m>1) the average response time in the normal state in responding to the request to transfer the message information to the second interconnected station.

* * * * *